United States Patent
Green

(10) Patent No.: US 7,025,232 B2
(45) Date of Patent: Apr. 11, 2006

(54) LIQUID-CANDY DISPENSING SPRAYER AND CONTAINER ASSEMBLY

(76) Inventor: John Green, 21507 Bayou Industrial Ct., Suite 1, Abita Springs, LA (US) 70420

( * ) Notice: Subject to any disclaimer, the term of this patent is extended or adjusted under 35 U.S.C. 154(b) by 129 days.

(21) Appl. No.: 10/448,591

(22) Filed: May 30, 2003

(65) Prior Publication Data

US 2004/0164102 A1    Aug. 26, 2004

Related U.S. Application Data

(60) Provisional application No. 60/385,479, filed on Jun. 3, 2002.

(51) Int. Cl.
  *B65D 88/54*    (2006.01)
(52) U.S. Cl. ............... 222/321.7; 222/321.9; 222/528; 222/533; 222/567
(58) Field of Classification Search ........... 222/321.7, 222/321.9, 402.1, 527–528, 533, 567
See application file for complete search history.

(56) References Cited

U.S. PATENT DOCUMENTS

| | | |
|---|---|---|
| 0,223,283 A | 1/1880 | Fritzner |
| 1,903,464 A | 4/1933 | Konanz |
| 2,630,944 A | 3/1953 | Wheaton |
| 2,805,800 A | 9/1957 | Malick et al. |
| 3,148,806 A | 9/1964 | Meshberg |
| 3,148,808 A * | 9/1964 | Griffin et al. ............ 223/86 |
| 3,221,950 A | 12/1965 | O'Donnell |
| 3,240,404 A | 3/1966 | Porter et al. |
| 3,262,613 A | 7/1966 | Miller |
| 3,266,682 A | 8/1966 | Schultz |
| 3,268,792 A * | 8/1966 | Barmherzig ............ 220/707 |
| 3,305,127 A | 2/1967 | Baranne |
| 3,393,844 A * | 7/1968 | Beres et al. ............ 222/533 |
| 3,471,066 A | 10/1969 | Micallef |
| 3,545,980 A | 12/1970 | Stanger |
| 3,563,422 A | 2/1971 | Cruikshank |
| 3,768,475 A * | 10/1973 | Osborne ............ 604/249 |
| 3,821,425 A | 6/1974 | Russell |

(Continued)

OTHER PUBLICATIONS

Various photographs from different views (attached items 1 thru 6) of a hand held nasal spray dispensing bottle with long rotating dispensing tube sprayer (the "Nasal Spray Bottle System") for spraying a nasal spray directly into the nasal cavity. The Nasal Spray Bottle System, as well as Nasal Spray Bottle System containing such nasal spray, was in public use and on sale in the United States not later than Jun. 2, 2001.

*Primary Examiner*—Frederick Nicolas
(74) *Attorney, Agent, or Firm*—Raymond G. Areaux; Lisa C. Velez

(57) ABSTRACT

A liquid-candy dispenser having a container and an extendable and rotatable dispensing nozzle sprayer that is adapted to be moved in multi-directions for fun and to permit better dispensing of the candy in children's mouths. The extendable and rotatable dispensing nozzle sprayer has a finger-actuated spray head to activate a fluid pumping unit. The sprayer also includes an elongated tube having one free end adapted to rotate 360° in a Y-plane with respect to and in fluid communication with the finger-actuated spray head. A dispensing nozzle is affixed to the other free end of the elongated tube.

47 Claims, 6 Drawing Sheets

U.S. PATENT DOCUMENTS

| | | |
|---|---|---|
| 4,229,482 A | 10/1980 | Kreske, Jr. |
| 4,234,127 A | 11/1980 | Tada et al. |
| 4,278,189 A | 7/1981 | Kirk, Jr. |
| 4,805,807 A | 2/1989 | Perne et al. |
| 4,858,792 A * | 8/1989 | de Laforcade ............... 222/533 |
| 4,865,230 A * | 9/1989 | Tugwood ................. 222/383.3 |
| 4,884,705 A | 12/1989 | Debetencourt |
| 5,005,717 A * | 4/1991 | Oilar ......................... 215/13.1 |
| 5,111,967 A | 5/1992 | Schreiber |
| 5,143,263 A * | 9/1992 | Newell ....................... 222/538 |
| 5,161,718 A | 11/1992 | Gueret |
| 5,249,715 A | 10/1993 | Tobler |
| 5,320,260 A | 6/1994 | Song et al. |
| 5,323,933 A | 6/1994 | Brakarz et al. |
| 5,324,527 A | 6/1994 | Coleman |
| 5,593,065 A | 1/1997 | Harrold |
| 5,733,448 A * | 3/1998 | Kaura ........................ 210/238 |
| 5,791,518 A | 8/1998 | Amann et al. |
| 6,105,826 A | 8/2000 | Oursin et al. |
| 6,109,547 A | 8/2000 | Ritsche |
| 6,187,352 B1 | 2/2001 | Crosbie |
| 6,516,974 B1 * | 2/2003 | Straus et al. ................ 222/195 |
| 6,565,899 B1 | 5/2003 | Cecere |

* cited by examiner

US 7,025,232 B2

LIQUID-CANDY DISPENSING SPRAYER AND CONTAINER ASSEMBLY

CROSS-REFERENCE TO RELATED APPLICATIONS

The present invention claims benefit of U.S. provisional patent application having Ser. No. 60/385,479 which was filed on Jun. 3, 2002.

BACKGROUND OF THE INVENTION

1. Field of the Invention

The present invention relates to liquid candy dispensers and, more particularly, to a liquid-candy dispensing sprayer and container assembly that includes a 360° rotating, extended dispensing nozzle.

2. General Background

Dispensing pumps that are small in size and finger-actuated are well known for use in atomizing perfumes, colognes and other personal care items, such as disclosed in U.S. Pat. No. 4,278,189, issued to Kirk, Jr., entitled "ACCUMULATIVE PRESSURE PUMP" which is incorporated herein by reference.

Breath refreshing solutions and candy have been dispensed through a sprayer nozzle as well. However, the finger-actuated nozzle head typically is easily removed by simply pulling the nozzle head off of the dispensing tube. This can be hazardous for the children's market since smaller children may swallow the nozzle head.

Additionally, this method of dispensing of a liquid candy has caused children to oftentimes miss their mouth and accidentally spray the candy in their eyes or elsewhere causing a mess.

Other dispensing pumps are described in U.S. Pat. No. 5,323,933, issued to Brakarz et al., entitled "ATOMIZER MICROPUMP FOR LIQUIDS" (which is incorporated herein by reference), which discloses a manually-operable liquid atomizer for spraying liquid.

In view of the above, there is a continuing need for a liquid-candy dispensing sprayer and container assembly that has a unitary, extendable, and rotatable dispensing-nozzle sprayer that can be rotated or swivel 360° to direct the spray in the mouth.

As will be seen more fully below, the present invention is substantially different in structure, methodology and approach from that of other spray dispensers.

SUMMARY OF THE PRESENT INVENTION

The preferred embodiment of liquid-candy dispensing sprayer and container assembly of the present invention solves the aforementioned problems in a straight forward and simple manner.

Broadly, the present invention contemplates a liquid-candy dispensing sprayer and container assembly comprising: a container for storing liquid candy therein and a pumping unit to pump the liquid candy from the container via a dip tube. The assembly further includes an extendable and rotatable dispensing nozzle sprayer.

The present invention contemplates an extendable and rotatable dispensing nozzle sprayer having a finger-actuated spray head to activate a pumping unit and which is in fluid communication with the pumping unit; an elongated tube having one free end adapted to rotate 360° in a Y-plane with respect to and in fluid communication with the finger-actuated spray head; and a dispensing nozzle coupled to the other free end of said elongated tube.

The present invention contemplates a liquid-candy dispensing sprayer and container assembly comprising: means for storing liquid candy therein having a longitudinal axis; means for pumping the liquid candy from the storing means; and, means for atomizing said liquid candy, said atomizing means comprises: means, which is finger-actuated, for actuating said pumping means and which is in fluid communication with said pumping means wherein said finger-actuated actuating means is adapted to be rotated 360° about said longitudinal axis, an elongated tube in fluid communication with said finger-actuated actuating means, means for rotatably coupling securely one free end of said elongated tube to said finger-actuated actuating means wherein said rotatably coupling means is adapted to rotate 360° along an axis which is essentially 90° displaced from the longitudinal axis, and means for dispensing said liquid candy which is securely coupled to the other free end of said elongated tube.

In view of the above, an object of the present invention is to provide a liquid-candy dispensing sprayer and container assembly that includes a finger-actuated nozzle head that is securely coupled to an elongated tube that can be rotated in multiple directions for fun when used.

Another object of the present invention is to provide a liquid-candy dispensing sprayer and container assembly that has an improved delivery system for dispensing the liquid candy in the mouth of the user and minimize accidentally spraying of the liquid candy in their eyes or elsewhere causing a mess.

Another object of the present invention is to provide a liquid-candy dispensing sprayer and container assembly that has an improved delivery system for dispensing the liquid candy in the mouth of the user while being safe for use by children.

In view of the above objects, it is a feature of the present invention to provide a liquid-candy dispensing sprayer and container assembly that is simple to use even by children.

Another feature of the present invention is to provide a liquid-candy dispensing sprayer and container assembly that is relatively simple structurally and thus simple to manufacture.

A still further object of the present invention is to provide a liquid-candy dispensing sprayer and container assembly that is made of transparent material to view the liquid candy.

The above and other objects and features of the present invention will become apparent from the drawings, the description given herein, and the appended claims.

BRIEF DESCRIPTION OF THE DRAWING

For a further understanding of the nature and objects of the present invention, reference should be had to the following description taken in conjunction with the accompanying drawings in which like parts are given like reference numerals and, wherein.

DETAILED DESCRIPTION OF THE PREFERRED EMBODIMENT

Figure 1:
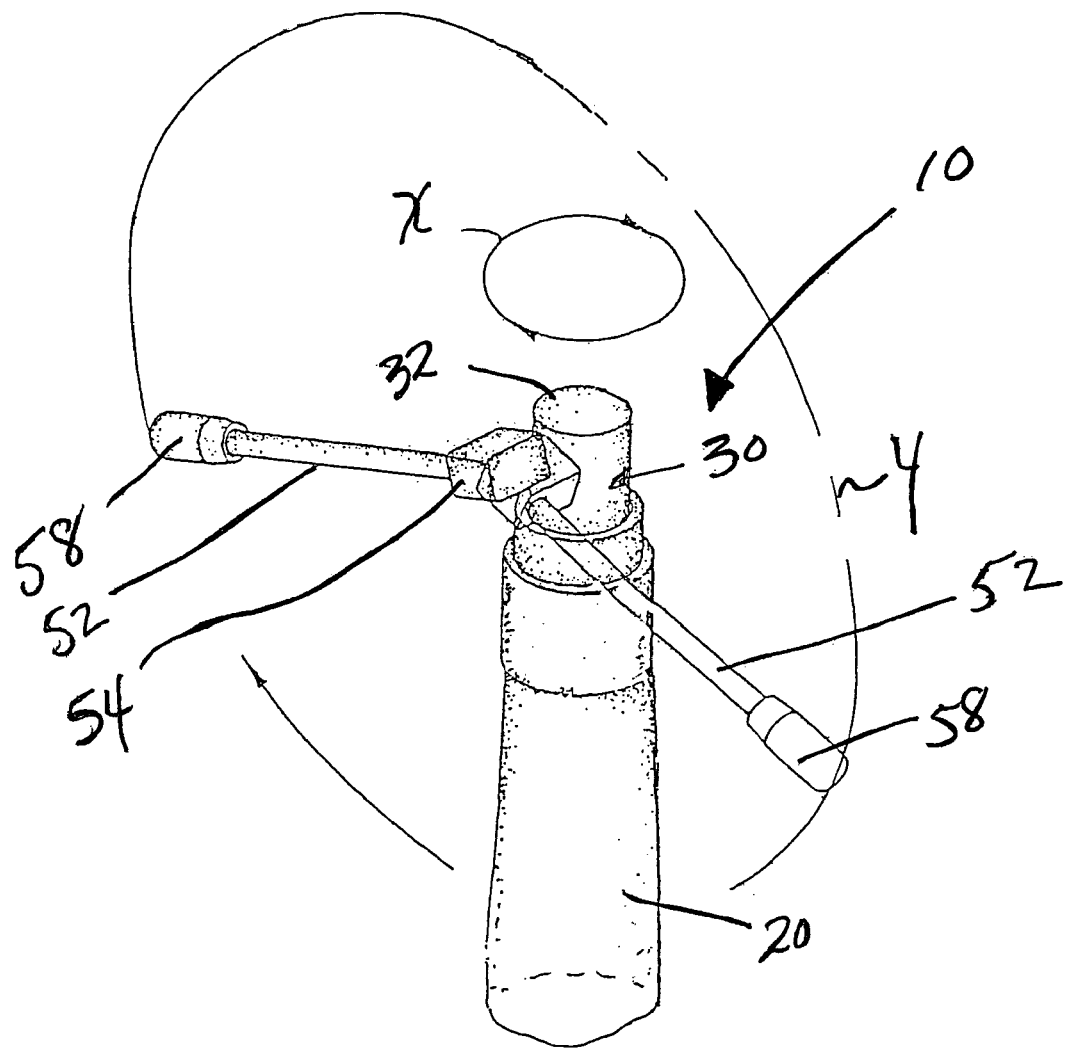
FIG. 1 illustrates a perspective view of the liquid-candy dispensing sprayer and container assembly of the present invention with two different rotations (approximately a 180° location and a 315° location) of the extendable and rotatable dispensing nozzle sprayer.
Figure 2:
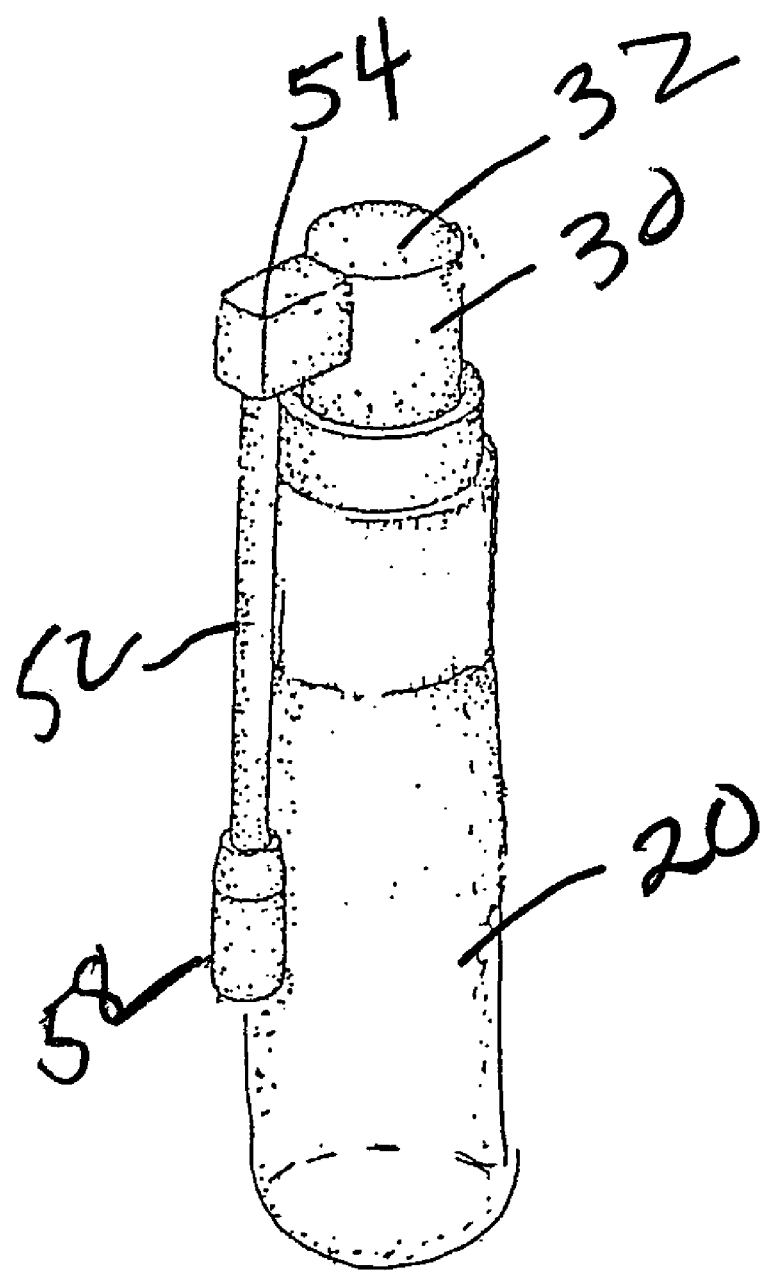
FIG. 2 illustrates a perspective view of the liquid-candy dispensing sprayer and container assembly of the present invention with the extendable and rotatable dispensing nozzle sprayer rotated to a 270° location.

Referring now to the drawings and in particular FIGS. 1–4, the liquid-candy dispensing sprayer and container assembly of the present invention is generally referenced by the numeral 10. The liquid-candy dispensing sprayer and container assembly 10 of the present invention is generally comprised of a container 20 adapted to store therein liquid contents 5 to be dispensed. In the preferred embodiment, the liquid contents is liquid candy or other edible fluid.

Figure 3:
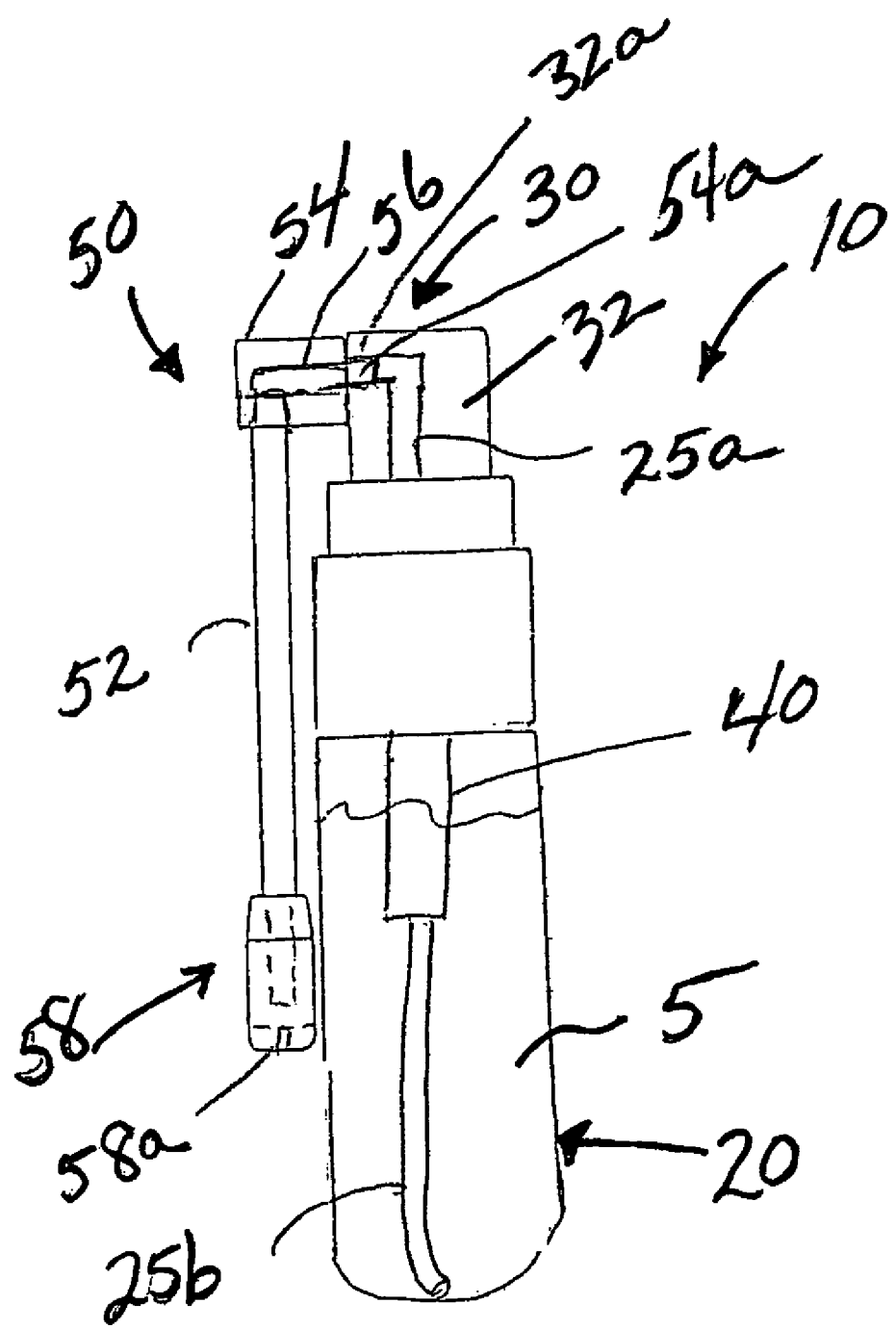
FIG. 3 illustrates a side view of the liquid-candy dispensing sprayer and container assembly of the present invention with the extendable and rotatable dispensing nozzle sprayer rotated to a 270° location and having liquid candy therein.
Figure 4:
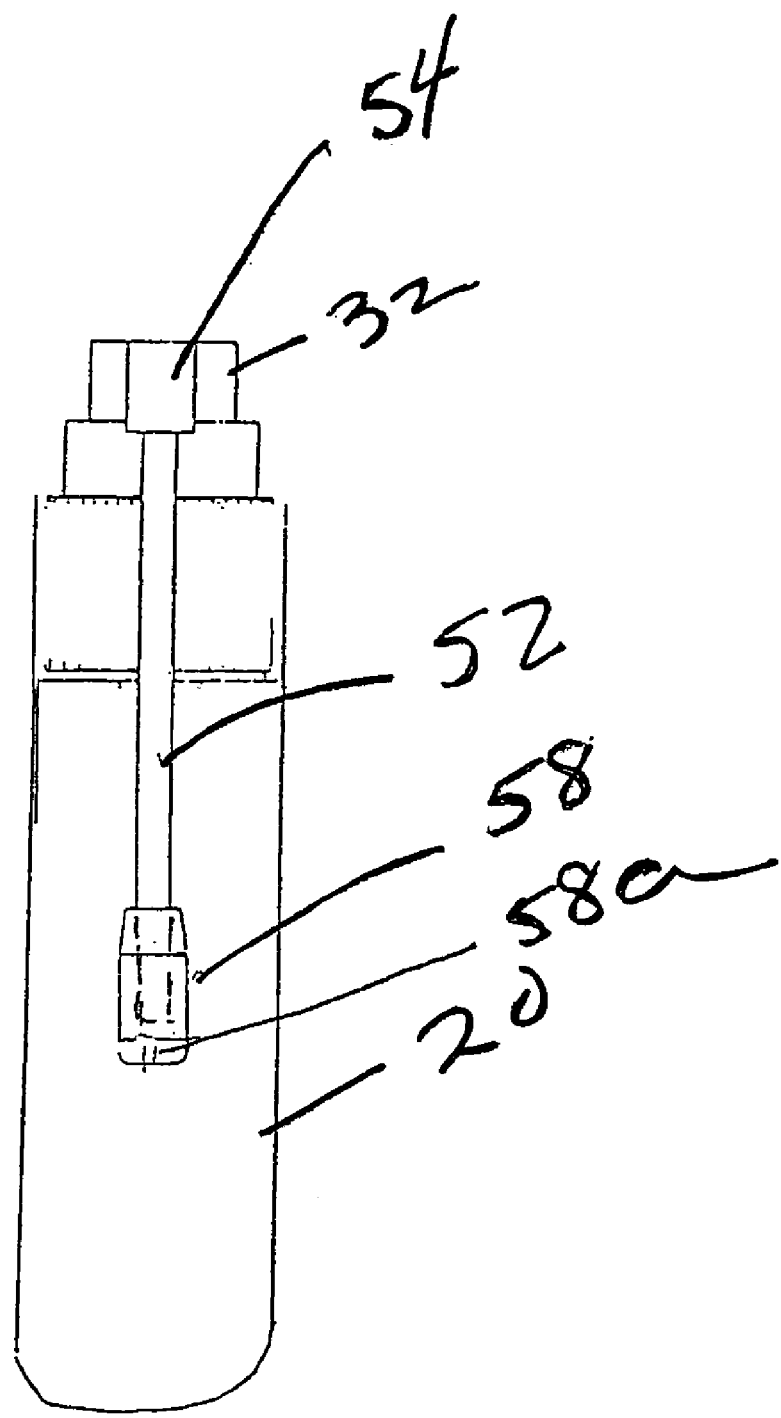
FIG. 4 illustrates a front view of the liquid-candy dispensing sprayer and container assembly of the present invention with the extendable and rotatable dispensing nozzle sprayer rotated to a 270° location.

The dispensing sprayer and container assembly 10 further includes an extendable and rotatable dispensing nozzle sprayer 30 that includes a finger-actuated spray head 32 in fluid communication via upper tube 25a coupled to a pumping unit 40 (FIGS. 3 and 4). The pumping unit 40 is disposed in the container 20 and has coupled thereto lower dip tubes 25b to channel the liquid contents 5 in the container 20 up to the finger-actuated spray head 32 via the pumping unit 40.

In the exemplary embodiment, the pumping unit 40 is a spring-operated ball-valve pumping unit that is small in size and lightweight. The pumping unit 40 is well known in the art. Thus, no further description is necessary. Nevertheless, other pumping units may be employed such as those used to atomize a liquid via a finger-actuated spray head.

Conventionally, the finger-actuated spray head includes an orifice to atomize and dispense the fluid at approximately 90° with respect to the dispensing tubes 25a and 25b. The extendable and rotatable dispensing nozzle sprayer 30 further includes an extension dispensing tube/atomizer 50 rotatably coupled to the finger-actuated spray head 32 at a location that is approximately 90° with respect to the fluid communication path defined by the upper tube 25a and dispensing tube 25b. The finger-actuated spray head 32 is adapted to be rotated 360° in the X-plane or with respect to the longitudinal axis of the container 20. The X-plane is essentially 90° displaced from the Y-plane. In the preferred embodiment, the finger-actuated spray head 32 may be continually rotated clockwise and, alternately, counterclockwise about a top of container 20.

The extension dispensing tube/atomizer 50 includes an elongated tube 52 having one free end rotatably coupled to the finger-actuated spray head 32 via a secure male connector 54 that allows the elongated tube 52 to be rotated 360° in the Y-plane, as best seen in FIG. 1, about the finger-actuated spray head 32. The elongated tube 52 is in fluid communication with the finger-actuated spray head 32 such that the flow of the liquid contents 5 being dispensed flows from the container through the tubes 25a and 25b and into the elongated tube 52 via a fluid channel 56 within the secure male connector 54.

The other free end of the elongated tube 52 has affixed thereto a dispensing nozzle 58 having an orifice 58a therein that atomizes the liquid contents 5 flowing through the other free end of the elongated tube 52. In the preferred embodiment, the dispensing nozzle 58 receives air so that the liquid contents 5 can be sprayed into a mist out through orifice 58a, especially, when pumped quickly.

In the exemplary embodiment, the secure male connector 54 includes a male coupler 54a adapted to be securely snapped fit within the mated female counterpart 32a within the finger-actuated spray head 32.

In the preferred embodiment, the snapped fit between the secure male connector 54 and the finger-actuated spray head 32 is not easily removed so that the extendable and rotatable dispensing nozzle sprayer 30 remains a unitary structure.

In the preferred embodiment, the container 20, finger-actuated spray head 32 and elongated tube 52 are made of transparent plastic material or other transparent material so that the user can determine the level of and visually see the liquid contents 5 in container 20. Furthermore, in the preferred embodiment, the container 20 and finger-actuated spray head 32 are colored such as with a variety of colors which may have neon-type properties. Furthermore, depending on the flavor of the liquid candy, the liquid candy may also be colored to add to the overall entertainment of the product. Various flavors of the liquid candy include strawberry, other sour citrus or fruit flavors, etc.

The container 20 may be colored different from the finger-actuated spray head 32. The dispensing nozzle 58 may have the same color as the finger-actuated spray head 32 or a different color.

The multi-directional rotation of the extendable and rotatable dispensing nozzle sprayer 30 provides for fun when used by children and provides a more accurate and safe delivery system.

In the exemplary embodiment, container 20 is cylindrically-shaped with a diameter of approximately ⅝ inch. The length from the top of the finger-actuated spray head 32 in a non-pressed state to the bottom of container 20 is approximately 4 inches.

The unitary structure of the extendable and rotatable dispensing nozzle sprayer 30 provides an additional safety feature in that it is not a small choking hazard as is a single finger-actuated spray head 32.

Figure 5:
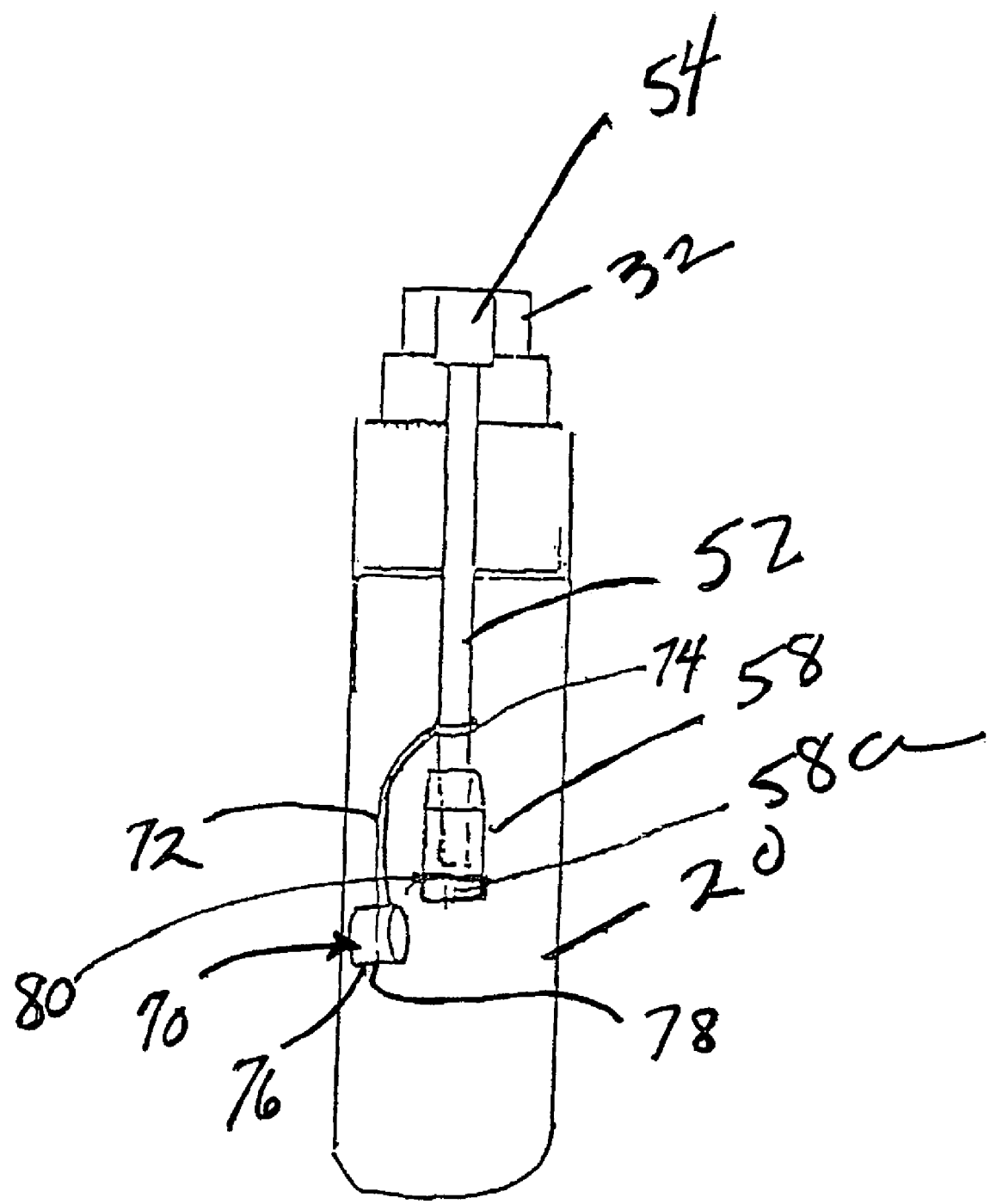
FIG. 5 illustrates a front view of the liquid-candy dispensing sprayer and container assembly of the present invention with the extendable and rotatable dispensing nozzle sprayer rotated to a 270° location and having a removable lid assembly; and, FIG. 6 illustrates an exploded view of an alternate embodiment of the extendable and rotatable dispensing nozzle sprayer.

Referring now to FIG. 5, in the preferred embodiment, a removable lid assembly 70 is provided to cover the dispensing nozzle 58 and more specifically, the orifice 58a. The removable lid assembly 70 includes a strap 72 having a loop 74 at one end that encircles the elongated tube 52. The other end of the strap 72 has fixedly coupled thereto lid member 76 that is dimensioned to fit around the dispensing nozzle 58.

In the exemplary embodiment, lid member 76 includes an annular recess 78 adapted to receive an annular ridge 80 formed around dispensing nozzle 58. Thus, lid member 76 snaps onto dispensing nozzle 58. Nevertheless, the lid member 76 can more simply be friction fit coupled around dispensing nozzle 58. As can be appreciated, the strap 72 prevents the removable lid assembly 70 from being lost or separated from the dispensing nozzle 58.

The lid assembly 70 is made of generally transparent colored plastic material.

Figure 6:
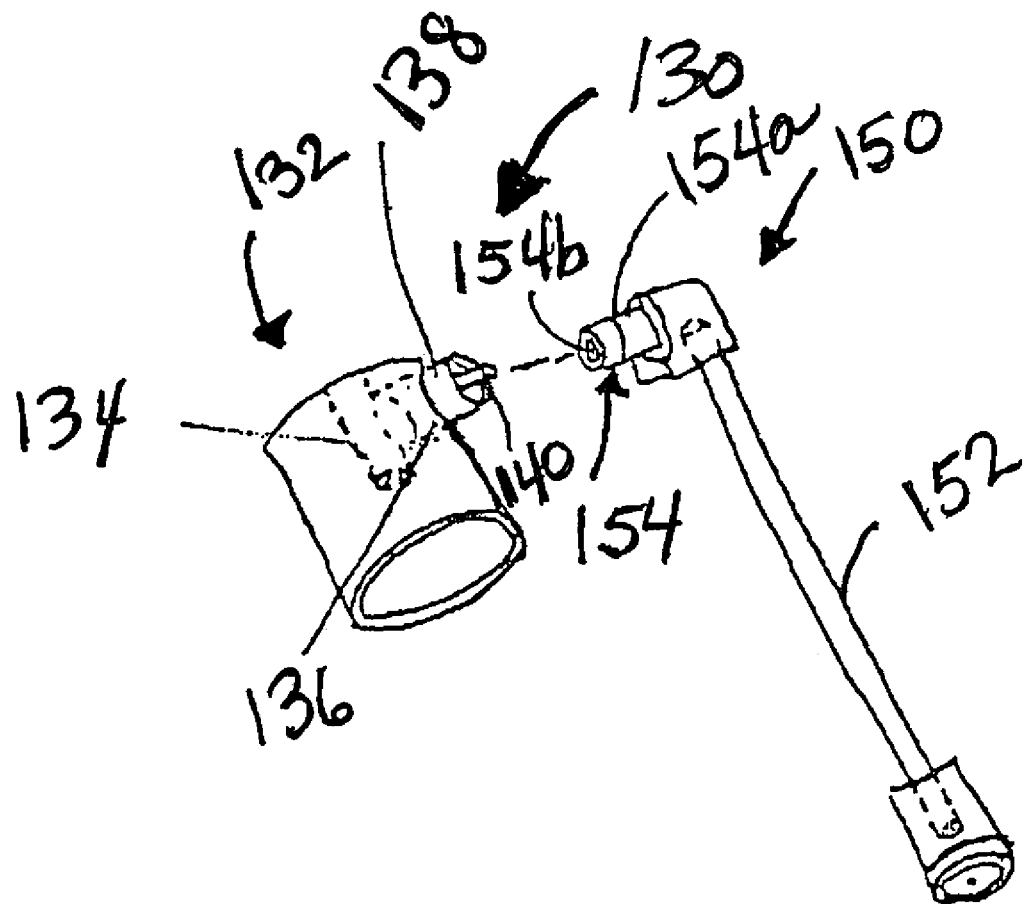

Referring now to FIG. 6, an alternate embodiment of the extendable and rotatable dispensing nozzle sprayer 30 is shown. The extension dispensing tube/atomizer 150 includes an elongated tube 152 having one free end rotatably coupled to the finger-actuated spray head 132 via a first secure male connector 154 that allows the elongated tube 152 to be rotated 360° in the Y-plane, about the finger-actuated spray head 132.

In the exemplary embodiment, the first secure male connector 154 is a tubular member having an annular groove 154a formed around the perimeter. The interior 154b of the tubular member is hollow to permit the flow of fluid therethrough and is dimensioned to friction fit couple therein a second male connector 140.

The finger-actuated spray head 132 includes a central tubular member 134 which is aligned with the longitudinal axis of container 20 and connects to tube 25a for the communication of the liquid contents 5. Central tubular member 134 has an orifice 136 positioned approximately 90° with respect to the longitudinal axis of container 20. Such orifice 136 includes a first tubular member 138 and a second male connector 140 (which is another tubular member) concentrically disposed within the first tubular member 138 and extends beyond the edge of the first tubular member 138. The first male connector 154 receives the second male connector 140 within its hollow interior 154b while the first male connector 154 is received between the first tubular member 138 and the second male connector 140. The first tubular member 138 includes an annular ridge to engage the annular groove 154a. Accordingly, the first male connector 154 is adapted to be securely snapped fit within the first tubular member 138 (serving as a mated female counterpart) and rotate 360°.

This arrangement between the first male connector 154, the first tubular member 138 and the second male connector 140 provides an improved secure snapped fit of the extension dispensing tube/atomizer 150 to the finger-actuated spray head 32 so that it is not easily removed and the extendable and rotatable dispensing nozzle sprayer 130 remains a unitary structure with rotatable capabilities.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A liquid-candy dispensing sprayer and container assembly comprising:
    a container for storing liquid candy therein;
    a pumping unit to pump the liquid candy from the container via a dip tube; and,
    an extendable and rotatable dispensing nozzle sprayer having a finger-actuated spray head to activate said pumping unit and which is in fluid communication with the pumping unit, an elongated tube having one free end adapted to rotate 360° in a Y-plane with respect to and in fluid communication with said finger-actuated spray head, and a dispensing nozzle coupled to the other free end of said elongated tube wherein said dispensing nozzle atomizes said liquid candy therefrom in a form of a mist.

2. The assembly of claim 1, wherein said container is made of transparent material.

3. The assembly of claim 1, wherein said extendable and rotatable dispensing nozzle sprayer is made of transparent material.

4. The assembly of claim 1, wherein the extendable and rotatable dispensing nozzle sprayer is essentially a unitary structure.

5. The assembly of claim 1, wherein said finger-actuated spray head is adapted to be rotated 360° in an X-plane which is essentially 90° displaced from the Y-plane.

6. The assembly of claim 1, further comprising:
    a removable lid assembly, the removable lid assembly comprising:
        a strap having a loop coupled around said elongated tube; and,
        a lid member affixed to said strap, the lid member being adapted to be snapped onto said dispensing nozzle.

7. The assembly of claim 6, wherein said container, said removable lid assembly and said extendable and rotatable dispensing nozzle sprayer are made of transparent plastic material of different colors.

8. The assembly of claim 7, wherein:
    said container is cylindrically-shaped with a diameter of approximately ⅝ inch; and,
    said assembly has a length of approximately 4 inches from a top of the finger-actuated spray head, in a non-pressed state, to a bottom of said container.

9. The assembly of claim 1, wherein:
    said finger-actuated spray head includes a center tubular member aligned with a longitudinal axis of said container, and an orifice displaced approximately 90° with respect to the longitudinal axis, wherein said orifice includes a first tubular member and a second tubular member concentrically disposed in said first tubular member; and,
further comprising:
    a third tubular member adapted to be securely snapped fit between the first tubular member and the second tubular member wherein the snapped fit allows for 360° rotation of said third tubular member;
    said third tubular member coupled to said one free end of said elongated tube.

10. The assembly of claim 9, further comprising:
    a removable lid assembly, the removable lid assembly comprising:
        a strap having a loop coupled around said elongated tube; and,
        a lid member affixed to said strap, said lid member being adapted to be snapped onto said dispensing nozzle.

11. The assembly of claim 1, wherein:
    said finger-actuated spray head is adapted to be rotated 360° in an X-plane which is essentially 90° displaced from the Y-plane; and,
    said extendable and rotatable dispensing nozzle sprayer is constructed and arranged to not provide a small choking hazard and to provide a fun, accurate and safe delivery system for dispensing said mist in a consumer's mouth.

12. The assembly of claim 1, wherein:
    said finger-actuated spray head is adapted to be rotated 360° in an X-plane which is essentially 90° displaced from the Y-plane; and,
    said extendable and rotatable dispensing nozzle sprayer comprises:
        means for eliminating small choking hazard and for providing a fun, accurate and safe delivery system for dispensing said mist in a consumer's mouth.

13. The assembly of claim 1, wherein:
    said finger-actuated spray head is adapted to be rotated 360° in an X-plane which is essentially 90° displaced from the Y-plane; and,
    said extendable and rotatable dispensing nozzle sprayer is essentially a unitary structure.

14. The assembly of claim 1, further comprising:
a lid adapted to be snapped onto said dispensing nozzle; and,
a strap with a loop coupled around said elongated tube to prevent separation of said lid from said assembly wherein:
said assembly is constructed and arranged to provide a fun and safe delivery system for dispensing said mist of said liquid-candy in a consumer's mouth with no small choking hazards.

15. The assembly of claim 1, further comprising:
liquid candy stored in said container.

16. A liquid-candy dispensing sprayer and container assembly comprising:
a container for storing liquid candy therein;
a pumping unit to pump the liquid candy from the container via a dip tube; and,
an extendable and rotatable dispensing nozzle sprayer having a finger-actuated spray head to activate said pumping unit and which is in fluid communication with the pumping unit, a rotatable coupler coupled to said finger-actuated spray via a secure snap-on connection, an elongated tube having one free end adapted to rotate 360° in a Y-plane with respect to and in fluid communication with said finger-actuated spray head via said rotatable coupler, and a dispensing nozzle securely coupled to the other free end of said elongated tube wherein said dispensing nozzle atomizes said liquid candy therefrom in a form of a mist.

17. The assembly of claim 16, wherein said container is made of transparent material.

18. The assembly of claim 16, wherein said extendable and rotatable dispensing nozzle sprayer is made of transparent material.

19. The assembly of claim 16, wherein the extendable and rotatable dispensing nozzle sprayer is essentially a unitary structure.

20. The assembly of claim 16, wherein said finger-actuated spray head is adapted to be rotated 360° in an X-plane which is essentially 90° displaced from the Y-plane.

21. The assembly of claim 16, further comprising:
a removable lid assembly, the removable lid assembly comprising:
a strap having a loop coupled around said elongated tube; and,
a lid member affixed to said strap, said lid member being adapted to be snapped onto said dispensing nozzle.

22. The assembly of claim 21, wherein said container, said removable lid assembly and said extendable and rotatable dispensing nozzle sprayer are made of transparent plastic material of different colors.

23. The assembly of claim 22, wherein:
said container is cylindrically-shaped with a diameter of approximately ⅝ inch; and,
said assembly has a length of approximately 4 inches from a top of the finger-actuated spray head, in a non-pressed state, to a bottom of said container.

24. The assembly of claim 16, wherein:
said finger-actuated spray head includes a center tubular member aligned with a longitudinal axis of said container, and an orifice displaced approximately 90° with respect to the longitudinal axis, wherein said orifice includes a first tubular member and a second tubular member concentrically disposed in said first tubular member; and,
said rotatable coupler comprises:
a third tubular member adapted to be securely snapped fit between the first tubular member and the second tubular member wherein the snapped fit allows for 360° rotation of said third tubular member;
said third tubular member coupled to said one free end of said elongated tube.

25. The assembly of claim 24, further comprising:
a removable lid assembly, the removable lid assembly comprising:
a strap having a loop coupled around said elongated tube; and,
a lid member affixed to said strap, said lid member being adapted to be snapped onto said dispensing nozzle.

26. The assembly of claim 16, wherein:
said finger-actuated spray head is adapted to be rotated 360° in an X-plane which is essentially 90° displaced from the Y-plane; and,
said extendable and rotatable dispensing nozzle sprayer is constructed and arranged to not provide a small choking hazard and to provide a fun, accurate and safe delivery system for dispensing said mist in a consumer's mouth.

27. The assembly of claim 16, wherein:
said finger-actuated spray head is adapted to be rotated 360° in an X-plane which is essentially 90° displaced from the Y-plane; and,
said extendable and rotatable dispensing nozzle sprayer comprises:
means for eliminating small choking hazard and for providing a fun, accurate and safe delivery system for dispensing said mist in a consumer's mouth.

28. The assembly of claim 16, wherein:
said finger-actuated spray head is adapted to be rotated 360° in an X-plane which is essentially 90° displaced from the Y-plane; and,
said extendable and rotatable dispensing nozzle sprayer is essentially a unitary structure.

29. The assembly of claim 16, further comprising:
a lid adapted to be snapped onto said dispensing nozzle; and
a strap with a loop coupled around said elongated tube to prevent separation of said lid from said assembly wherein:
said assembly is constructed and arranged to provide a fun, accurate and safe delivery system for dispensing said mist of said liquid-candy in a consumer's mouth with no small choking hazards.

30. The assembly of claim 16, further comprising:
liquid candy stored in said container.

31. An extendable and rotatable dispensing nozzle sprayer for dispensing liquid candy comprising:
a finger-actuated spray head to activate a fluid pumping unit and which is in fluid communication with the pumping unit;
an elongated tube having one free end adapted to rotate 360° in a Y-plane with respect to and in fluid communication with said finger-actuated spray head via a secure rotatable coupling; and,
a dispensing nozzle securely coupled the other free end of said elongated tube for atomizing said liquid candy wherein:
said finger-actuated spray head includes a center tubular member aligned with a first axis, and an orifice displaced approximately 90° with respect to the first axis, wherein said orifice includes a first tubular member and a second tubular member concentrically disposed in said first tubular member; and, said secure rotatable coupling comprises:

a third tubular member adapted to be snapped fit between the first tubular member and the second tubular member wherein the snapped fit allows for 360° rotation of said third tubular member, said third tubular member coupled to said one free end of said elongated tube.

32. The sprayer of claim 31, wherein the finger-actuated spray head, said elongated tube and said dispensing nozzle are constructed and arranged to form a unitary structure.

33. The sprayer of claim 31, wherein said finger-actuated spray head is adapted to be rotated 360° in an X-plane which is essentially 90° displaced from the Y-plane.

34. The sprayer of claim 31, wherein said finger-actuated spray head, said elongated tube and said dispensing nozzle are made of transparent plastic material.

35. A liquid-candy dispensing sprayer and container assembly comprising:

means for storing liquid candy therein having a longitudinal axis;

means for pumping the liquid candy from the storing means; and, means for atomizing said liquid candy, said atomizing means comprises:

means, which is finger-actuated, for actuating said pumping means and which is in fluid communication with said pumping means wherein said finger-actuated actuating means is adapted to be rotated 360° about said longitudinal axis, an elongated tube in fluid communication with said finger-actuated actuating means, means for rotatably coupling securely one free end of said elongated tube to said finger-actuated actuating means wherein said rotatably coupling means is adapted to rotate 360° along an axis which is essentially 90° displaced from the longitudinal axis, and means for dispensing said liquid candy which is securely coupled to the other free end of said elongated tube wherein said dispensing means atomizes said liquid candy therefrom in a form of a mist.

36. The assembly of claim 35, wherein said storing means is made of transparent material.

37. The assembly of claim 35, wherein said atomizing means is made of transparent material.

38. The assembly of claim 35, wherein the atomizing means is essentially a unitary structure.

39. The assembly of claim 35, wherein said finger-actuated actuating means is adapted to be continually rotated clockwise and, alternately, counterclockwise about a top of said storing means.

40. The assembly of claim 35, further comprising:

means for covering said dispensing means wherein said covering means includes means for strapping said covering means around said elongated tube.

41. The assembly of claim 40, wherein said storing means, said covering means and said atomizing means are made of transparent plastic material of different colors.

42. The assembly of claim 35, wherein:

said storing means is cylindrically-shaped with a diameter of approximately ⅝ inch; and, said assembly has a length of approximately 4 inches from a top of the finger-actuated actuating means, in a non-pressed state, to a bottom of said storing means.

43. The assembly of claim 35, wherein:

said finger-actuated actuating means includes a center tubular member aligned with said longitudinal axis of said storing means, and an orifice displaced approximately 90° with respect to the longitudinal axis, wherein said orifice includes a first tubular member and a second tubular member concentrically disposed in said first tubular member; and, said rotatable coupling means comprises:

a third tubular member adapted to be securely snapped fit between the first tubular member and the second tubular member wherein the snapped fit allows for 360° rotation of said third tubular member;

said third tubular member coupled to said one free end of said elongated tube.

44. The assembly of claim 35, wherein:

said atomizing means is constructed and arranged to not provide a small choking hazard and to provide a fun, accurate and safe delivery system for dispensing said mist in a consumer's mouth.

45. The assembly of claim 35, wherein said atomizing means comprises:

means for eliminating small choking hazards and providing a fun, accurate and safe delivery system for dispensing said mist in a consumer's mouth.

46. The assembly of claim 35, further comprising:

means for covering said dispensing means wherein said covering means includes means for strapping said covering means wound said elongated tube wherein said assembly is constructed and arranged to provide a fun, accurate and safe delivery system for dispensing said mist of said liquid-candy in a consumer's mouth with no small choking hazards.

47. The assembly of claim 35, further comprising:

liquid candy stored in said storing means.

* * * * *